May 8, 1951  E. L. NOTESTEIN  2,551,896
POST DRIVING APPARATUS

Filed Oct. 22, 1947  2 Sheets-Sheet 1

INVENTOR
EDISON L. NOTESTEIN
BY
*O. H. Fowler*
ATTORNEY

May 8, 1951  E. L. NOTESTEIN  2,551,896
POST DRIVING APPARATUS
Filed Oct. 22, 1947  2 Sheets-Sheet 2
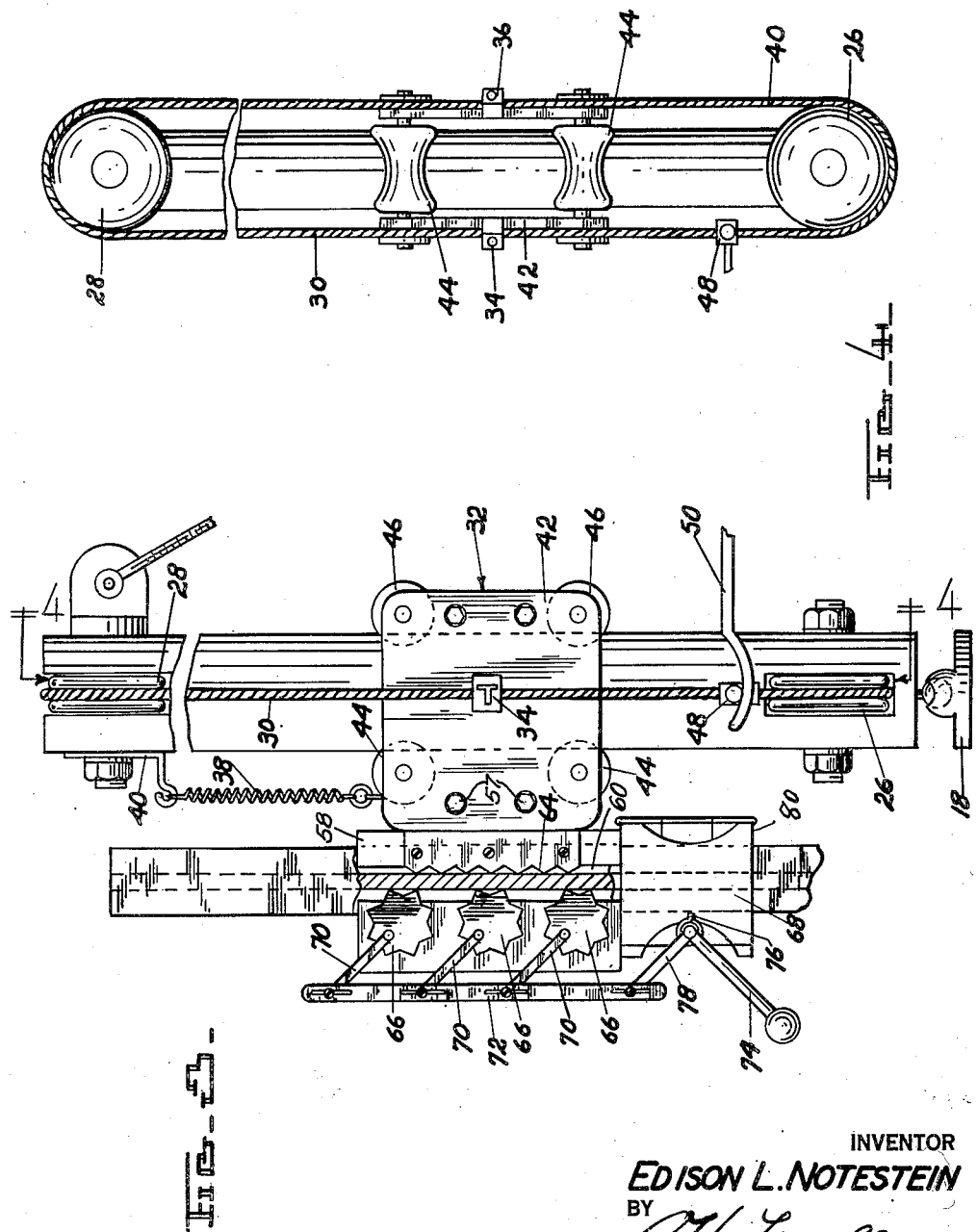
INVENTOR
EDISON L. NOTESTEIN
BY
O. H. Fowler
ATTORNEY Patented May 8, 1951

2,551,896

UNITED STATES PATENT OFFICE 2,551,896

POST DRIVING APPARATUS

Edison Lowell Notestein, Sarasota, Fla.

Application October 22, 1947, Serial No. 781,386

8 Claims. (Cl. 254—29)

This invention relates to post drivers and more particularly to a type that may be operated by the power take-off of a tractor.

Broadly the invention comprehends a fence post driver adapted to be attached to a tractor and driven by the power take-off thereof. The invention further comprehends a simple and efficient fence post driver and/or extractor adapted to be supported on the hitch of a conventional tractor and so connected to the tractor and its position with relation thereto may be varied to compensate for variations in the lay of the land in which the posts are to be driven or removed therefrom.

An object of the invention is to provide a simple and inexpensive post driver and/or extractor that may be easily and quickly attached to a conventional tractor and connected to the power take-off thereof and will when properly installed efficiently perform its intended functions.

Another object of the invention is to provide a post driving and extracting apparatus having but few component parts which may be produced at low cost and easily and quickly assembled.

Other objects and advantages of the invention will appear from the following description when taken in connection with the drawings forming a part of this specification, and in which:

Fig. 3 is an enlarged detail view of guide and driving head, and

Fig. 4 is a sectional view substantially on line 4—4 of Fig. 3.

Figure 1:
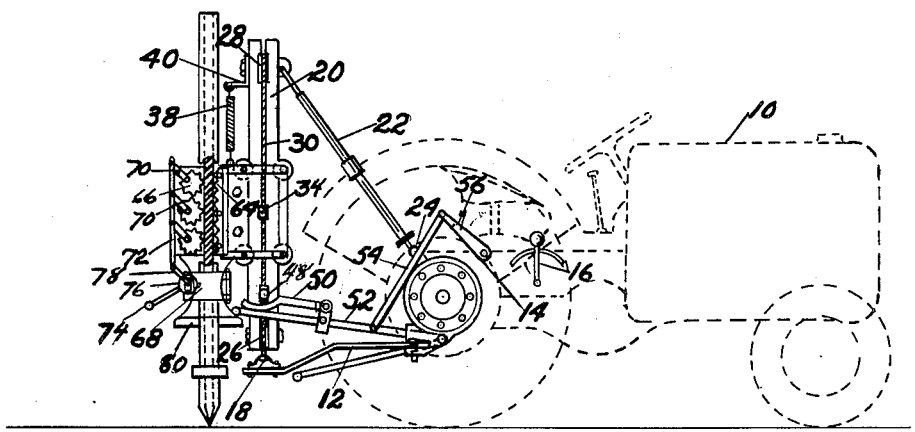
Fig. 1 is a side elevation of a tractor illustrating the invention as applied.
Figure 2:
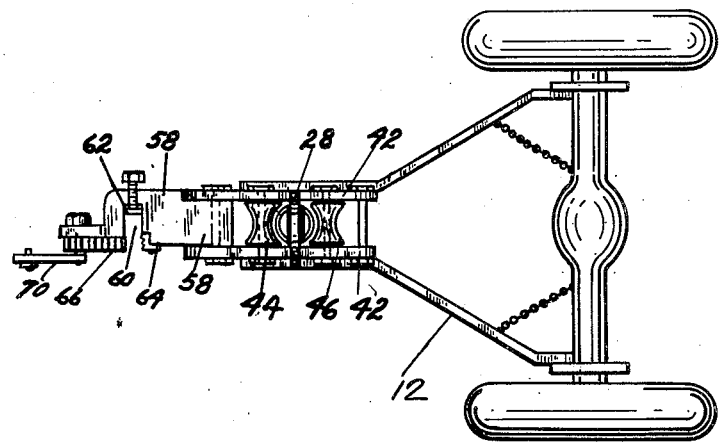
Fig. 2 is a top plan view of an axle and wheel assembly and a conventional hitch supporting the post driver and extractor.

Referring to the drawings for more specific details of the invention 10 indicates a tractor which may be of any preferred type having a conventional hitch 12 and a power take-off 14, controlled as by a lever 16.

A universal joint 18, suitably secured to the hitch 12 supports a column 20 preferably of tubular stock so as to lighten the weight thereof. The universal joint so supports the column that it may be tilted in any direction so as to compensate for variation in the lay of the ground in which the post is to be set, and adjustable supports 22 secured to the upper or free end of the column 20 and to flanges 24 on the rear axle of the tractor serve to retain the column in adjusted position.

The lower and upper ends of the column 20 are slotted and sheaves 26 and 28 suitably supported for rotation in the slot have mounted thereon for travel an endless cable 30. A driving head 32 mounted for travel on the column 20 is adapted to be secured to the cable 30 as by clamps 34 and 36 and is balanced by a spring 38 having one end secured to the head 32 and the other end secured to a bracket 40 supported on the column.

The head includes spaced plates 42 having mounted therebetween two pairs of rollers 44 and 46 so spaced with relation to one another both as to pairs and as to the individual rollers that they embrace the column 20 so as to support the head 32 for travel.

The cable 30 has thereon a lug 48 for the reception of an arm 50 adjustably supported on a lever 52 pivoted on the rear axle of the tractor and connected as by a link 54 to a crank 56 on the power take-off shaft 14, and the plates 42 of the head have secured therebetween as by bolts 57 a block 58 having a slot 60 for the reception of a post, and in bottom of the slot is an adjustable support 62 serving to vary the depth of the slot so as to accommodate posts of various widths.

A ratchet 64 suitably supported on one side of the slot, and a plurality of cams 66 having serrated faces, mounted on the other side of the slot in spaced and oppositely disposed relation to the ratchet 64, serve to grip the post, and a door 68 adapted to close over the slot serves to hold the post against displacement. As shown, the cams 66 have arms 70 connected as by a rod 72, and a hand lever 74 for control of a latch 76 for the door 68 has a lateral arm 78 pivoted to the rod 72 for simultaneously latching the door and engaging the cams 66 with the post.

The block 58 has a dependent shoe or ram 80 for packing or ramming the earth around the post after it has been driven in the earth to the desired depth.

In a normal operation the apparatus is adjusted to set the column 20 at the desired inclination. This may be effected by proper adjusting the supports 22. The post is then slipped into the slot 60 in the driving head 32 and the door 68 closed. The lever 72 is then thrown to lock the door and simultaneously with this operation the cams 66 are rotated to grip the post between the ratchet 64 and the cams.

The clamp 36 is adjusted to secure the head 32 to the cable 30 and the lever 16 is then thrown to apply power to the take-off shaft 14, and the applied power is transmitted therefrom through the crank 56 and link 54 to the lever 52 resulting in swinging the lever upwardly. During this movement of the lever 52, the arm 50 thereon engages the lug 48 on the cable 30 exerting a pull on the cable resulting in downward travel of the head 32 on the column 20 and this downward travel of the head forces the post in the ground, and upon forcing the post into the ground to a predetermined depth, the ram 80 strikes the earth with sufficient force to effectively pack the earth around the post.

When it is desired to draw a post from the ground the driving head 32 is turned on the column 20 so that the post may be received in the slot 60, the door 68 is then closed and the lever 74 thrown so as to reverse the position of the cams 66 for engagement with the post, the clamp 34 is then tightened so as to secure the cable 30 to head 32 and the clamp 34 loosened. Under this condition when force is applied from the shaft 14 through the crank 56 and the link 54 to the lever 52, the arm 50 thereon engages the lug 48 and exerts a pull on the cable and this results in raising the head 32 carrying with it the post.

While this invention has been described in connection with certain specific embodiments, the principle involved is susceptible of numerous other applications that will readily occur to persons skilled in the art.

Having thus described the various features of the invention, what I claim as new and desire to secure by Letters Patent is:

1. A post driving apparatus comprising a fixed support, a column thereon, means for changing and retaining the angular relationship of the column to the support, a head slidable on the column, means on the head for clutching a post and means for applying power to the head.

2. A post driving apparatus comprising a fixed support, a column pivotally attached thereto, means for adjusting and retaining the angular relationship of the column to the support, a head slidable on the support, a reversable clutch for a post carried by the head, and means for applying force to the head for upward or downward movement thereof.

3. A post driving apparatus comprising a fixed support, a column pivotally attached thereto, adjustable tie rods for regulating the angular relation of the column to the support, a head movable on the column, a reversable clutch for a post carried by the head, and means for applying power to the head for movement thereof on the column.

4. In a post driving apparatus, a driving head having a slot for the reception of a post, an adjustable support in the slot operative to vary the depth of the slot to accommodate posts of different size, a ratchet at one side of the slot, a plurality of cams at the other side of the slot, and means for actuating the cams in unison for gripping the post between the ratchet and the cams.

5. In a post driving apparatus, a driving head having a slot for the reception of a post, means supporting the head for movement, a ratchet at one side of the slot, a plurality of cams at the other side of the slot cooperating with the ratchet to effectually clutch the post, a door adapted to close over the slot below the ratchet and cams determining the position of the post in the slot, and linkage for latching the door and simultaneously actuating the cams so as to grip the post between the cams and the ratchet.

6. In a post driving apparatus a fixed support, a column mounted thereon, a sheave mounted at the base and at the top of the column, an endless cable mounted for travel on the sheaves, a driving head mounted for travel on the column, means for adjusting the angular relation of the column to the support, means for attaching the head to the cable, a clutch for a post carried by the head, and means for applying force to the cable for raising and lowering the head.

7. In combination with a tractor having a hitch and a power take-off, a column mounted on the hitch, adjustable tie rods connected between the top of the column and the tractor for adjusting the angular position of the column to the clutch, a sheave mounted at the base and at the top of the column, an endless cable mounted for travel on the sheaves, a driving head mounted for travel on the column, means for attaching the head to the cable, a clutch carried by the head, and linkage connected to the power take-off for applying force to the cable.

8. In combination with a tractor having a hitch, and a power take-off, a post driving apparatus including column pivotally supported on the hitch, adjustable tie rods connecting the column to the tractor to change the angular relationship of the column to the hitch, a sheave mounted at the base and at the top of the column, an endless cable mounted for travel on the sheaves, a driving head mounted for travel on the column, means for securing the head to the cable, means carried by the head for the reception of a post including means for gripping the post, and linkage connecting the cable to the power take-off for moving the head.

EDISON LOWELL NOTESTEIN.

REFERENCES CITED

The following references are of record in the file of this patent:

UNITED STATES PATENTS

| Number | Name | Date |
| --- | --- | --- |
| Re. 7,348 | Canan | Oct. 10, 1876 |
| 976,600 | Rhodes | Nov. 22, 1910 |
| 2,244,899 | Smith | June 10, 1941 |
| 2,424,115 | Powell | July 15, 1947 |

FOREIGN PATENTS

| Number | Country | Date |
| --- | --- | --- |
| 501,554 | Great Britain | Mar. 1, 1939 |